Patented Feb. 3, 1931

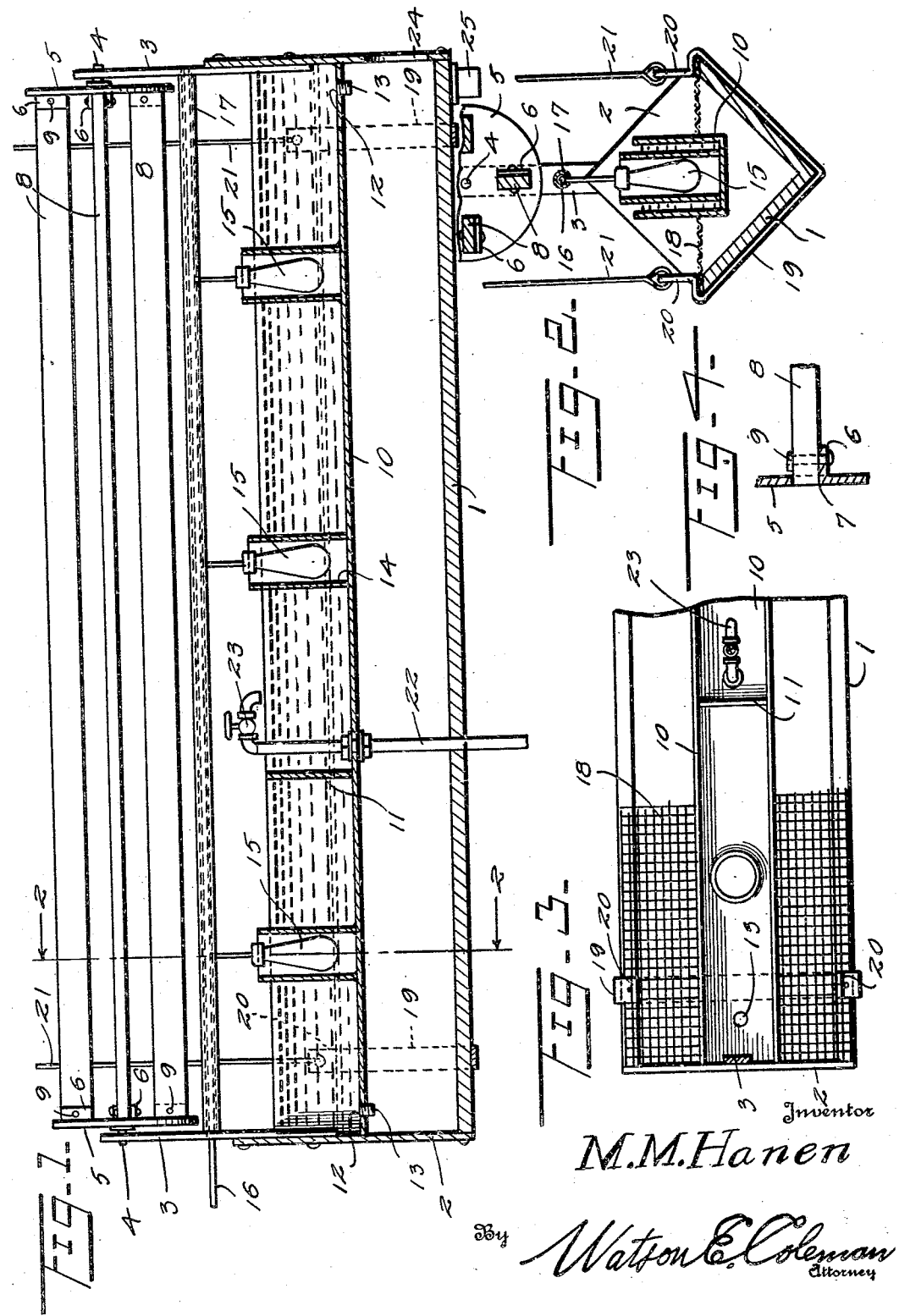

1,791,410

UNITED STATES PATENT OFFICE

MAXWELL M. HANEN, OF NALLPEE, WASHINGTON

POULTRY FOUNTAIN

Application filed February 1, 1930. Serial No. 425,273.

This invention relates to improvements in poultry fountains, and relates particularly to a fountain so constructed that the contents thereof may be kept from freezing during cold weather.

The primary object of the present invention is to provide a poultry fountain which in addition to being so constructed that the contents may be maintained at a temperature above freezing, is so designed that the poultry in feeding therefrom will be prevented from scattering the contents or getting into or otherwise dirtying the container in which the water or food is placed.

Still another object of the invention is to provide a poultry fountain having a grating platform upon which the poultry must stand while feeding from the fountain and through which scattered food or liquid from the feeding trough will fall to a receptacle below and be kept from dirtying the chicken house in which the fountain is housed.

The invention broadly contemplates the provision of a receptacle in which is placed an elongated trough at each side of which a screen support is arranged upon which the poultry stand while feeding from the trough, the said support overlying a portion of the receptacle so that liquid splashed from the trough will fall through the support into the receptacle. An overbalanced rotating structure is arranged over the trough so that the poultry will be prevented from perching thereover and the trough is provided with a plurality of upstanding receptacles in each of which an incandescent electric bulb is suspended which while lighted will maintain the contents of the trough at an even temperature so that freezing thereof cannot take place.

The invention will be best understood from a consideration of the following detailed description taken in connection with the accompanying drawing forming a part of the present invention with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a longitudinal sectional view through the poultry fountain embodying the present invention;

Figure 2 is a transverse sectional view taken upon the line 2—2 of Figure 1;

Figure 3 is a top plan view of one end of the structure with the revolving overlying perch removed, and Figure 4 is a detailed sectional view through one end of the revolving perch showing a constructional detail thereof.

Referring more particularly to the drawing wherein like numerals of reference indicate corresponding parts throughout the several views, the numeral 1 indicates the receptacle body of the fountain, which body as shown in Figure 2 is of V-shaped cross sectional design.

Each end wall 2 of the body comprises the four-sided plate shown, two sides of which are connected to an end of the receptacle 1 leaving an upstanding portion projecting above the receptacle as shown in Figure 2.

To each of these upstanding portions of the end walls an upright bar 3 is secured which supports upon a pivot pin 4 a revolving perch plate or disk 5.

Each of the disks 5 has cut therefrom a tongue 6 which is turned inwardly as shown in Figure 4, the adjacent opening 7 thus formed receiving one end of a bar 8, a suitable holding bolt 9 being passed through each end of the bar 8 and the adjacent tongue 6 to secure the bar to and between the plates 5.

Extending longitudinally through the upper part of the receptacle 1 and secured to and maintained in position by the end walls 2 is a trough 10, intermediate the ends of which a partition 11 is placed dividing the trough into two sections. Each of the sections of the trough is provided with a drain opening 12 which is normally maintained closed by a plug 13.

Disposed in upright position in the trough 10 is a number of open topped cylinders 14 each of which is designed to house an incandescent electric bulb 15 suspended in a manner shown from a feed wire 16 which passes through a housing conduit 17 arranged above the trough 10 and supported by the upstanding arms 3.

Connecting each longitudinal edge of the receptacle 1 with the adjacent side of the trough 10 is a heavy wire screen or grid 18 which forms a platform upon which the poultry must perch in order to drink from the trough 10.

Secured to each end of the receptacle 1 is a supporting band 19 which is turned in at each end over the edges of the receptacle to provide a suspending eye 20 in which a suitable support such as indicated at 21 may be connected so that the fountain may be suspended in a poultry house above the floor thereof.

The trough 10 is divided into two portions so that one side may be kept filled with water while the other side may be used for liquid food such as milk or the like and in order to facilitate the filling of the water side of the portion a pipe line 22 may be run through the bottom of the receptacle and put through the bottom of the trough as shown and provided with a faucet 23.

One of the end walls 2 of the receptacle is provided with a clean-out opening 24 and the bottom of the receptacle is also provided with a drain 25 which is preferably placed at the end of the receptacle where the clean-out opening 24 is located.

From the foregoing description it will be readily apparent that with a fountain of the character herein described liquid food in the trough may be kept at an even temperature and thus prevented from freezing during cold weather, and the poultry may drink therefrom without dirtying the surrounding poultry house floor. In addition to this the poultry are prevented from perching over the trough by the revolving perch which is made up of the bars 8 supported between the revolving disks 5 at the ends thereof.

Having thus described my invention, what I claim is:—

1. A poultry fountain comprising an elongated receptacle having an open top, a trough within and extending longitudinally of the receptacle and spaced from the bottom thereof, and a foraminous platform at each side of said trough connecting the same with an adjacent edge of the receptacle.

2. A poultry fountain comprising an elongated receptacle having an open top, a trough within and extending longitudinally of the receptacle and spaced from the bottom thereof, a foraminous platform at each side of said trough connecting the same with an adjacent edge of the receptacle, and means for maintaining the contents of said trough at an even temperature.

3. A poultry fountain comprising an elongated receptacle, an upstanding member at each end of the receptacle, a revolvable perch extending longitudinally of the receptacle and supported by said upstanding members, a liquid trough extending longitudinally of the receptacle and supported therein between the end walls thereof, and a foraminous platform projecting laterally from each side of the trough and overlying a portion of the receptacle.

4. A poultry fountain comprising an elongated receptacle, a trough supported in and extending longitudinally of the receptacle and further extending above the top thereof, a plurality of heating elements within said trough, drain means for the trough discharging into the receptacle, and a foraminous platform extending longitudinally of the trough at each side and overlying the receptacle.

5. A poultry fountain comprising an elongated receptacle, a trough supported in and extending longitudinally of the receptacle and further extending above the top thereof, a plurality of heating elements within said trough, drain means for the trough discharging into the receptacle, a foraminous platform extending longitudinally of the trough at each side and overlying the receptacle, and a revolvable perch disposed above and extending longitudinally of the trough.

6. A poultry fountain of the character described comprising an elongated receptacle, a liquid trough within and extending longitudinally of the receptacle, a plurality of upstanding cylinders within said trough, each of said cylinders being open at its upper end, an electric wiring housing conduit extending longitudinally of and over said portion, incandescent bulbs suspended from said housing, each extending into a cylinder, and a poultry support at each side of the trough.

7. A poultry fountain of the character described comprising an elongated receptacle, a liquid trough within and extending longitudinally of the receptacle, a plurality of upstanding cylinders within said trough, each of said cylinders being open at its upper end, an electric wire housing conduit extending longitudinally of and over said trough, incandescent bulbs suspended from said housing, each extending into a cylinder, and a screen platform extending longitudinally of each side of the trough and connecting the same with the adjacent edge of the receptacle.

8. A poultry fountain of the character described comprising an elongated receptacle, a liquid trough within and extending longitudinally of the receptacle, a plurality of upstanding cylinders within said trough, each of said cylinders being open at its upper end, an electric wire housing conduit extending longitudinally of and over said trough, incandescent bulbs suspended from said housing, each extending into a cylinder, a screen platform extending longitudinally of each side of the trough and connecting the same with the adjacent edge of the receptacle, means for suspending the receptacle, and means overlying the trough for preventing the poultry from roosting thereover.

9. A revolving perch of the character described comprising a pair of disks, means for rotatably mounting the same, each of said disks having a plurality of apertures formed therethrough bordered on one side by an inwardly projecting tongue, and a plurality of bars disposed between the disks, each connected at one end to one of said tongues and extending into the aperture adjacent thereto.

In testimony whereof I hereunto affix my signature.

MAXWELL M. HANEN.